United States Patent [19]
Borth

[11] Patent Number: 5,121,412
[45] Date of Patent: Jun. 9, 1992

[54] ALL-DIGITAL QUADRATURE MODULATOR

[75] Inventor: David E. Borth, Palatine, Ill.

[73] Assignee: Motorola, Inc., Schaumburg, Ill.

[21] Appl. No.: 292,719

[22] Filed: Jan. 3, 1989

[51] Int. Cl.⁵ .......................................... H04L 27/20
[52] U.S. Cl. ...................................... 375/67; 332/104
[58] Field of Search ........................ 375/67, 56, 45, 47, 375/52, 77, 39, 58, 61, 62; 332/100, 103, 106, 104

[56] References Cited

U.S. PATENT DOCUMENTS

| | | | |
|---|---|---|---|
| 3,971,996 | 7/1976 | Motley et al. | 375/39 |
| 4,100,369 | 7/1978 | Stenstrom et al. | 375/67 |
| 4,229,821 | 10/1980 | de Jager et al. | 375/53 |
| 4,581,749 | 4/1986 | Carney et al. | 375/44 |
| 4,680,556 | 7/1987 | Nakamura et al. | 332/103 |
| 4,686,688 | 8/1987 | Chung et al. | 375/67 |
| 4,843,613 | 6/1989 | Crowle | 375/67 |

OTHER PUBLICATIONS

Amoroso, Frank, et al., "Simplified MSK Signaling Technique", *IEEE Transactions on Communications*, Apr. 1977, pp. 433-441.

Anderson, *Digital Phase Modulation*, (New York: Plenum Press, 1986), ch. 6, pp. 211-235.

de Jager, F., et al., "Tamed Frequency Modulation, A Novel Method to Achieve Spectrum Economy in Digital Transmission", *IEEE Transactions on Communications*, vol. COM-26, No. 5, (May 1978), pp. 534-542.

Muratore, Flavio, et al., "Features and Performance of 12PM3 Modulation Methods for Digital Land Mobile Radio", *IEEE Journal on Selected Areas in Communications*, vol. SAC-5, No. 5, (Jun. 1987), pp. 906-914.

Suzuki H., et al., "Single-Chip Baseband Waveform Generator CMOS-LSI for Quadrature-type GMSK Modulator", *Electronics Letters*, (Oct. 11, 1984), vol. 20, No. 21, pp. 875-876.

Zavrei, Robert J., Jr., "Digital Modulation Using the NCMO ™ ", *RF Design*, (Mar. 1988), pp. 27-32.

*Primary Examiner*—Benedict V. Safourek
*Attorney, Agent, or Firm*—Steven G. Parmelee

[57] ABSTRACT

A CPFSK quadrature modulator (300) is disclosed utilizing an all-digital implementation. The serial data input signal (20 ) is formatted into parallel overlapping bits using a shift register (202), an up/down counter (206), and an interpolation counter (204) and applied as address lines to in-phase and quadrature-phase memories (208, 210). A multiple of the bit clock is used to address carrier generation ROMs (216, 218). The carrier signal is then modulated by the in-phase and quadrature-phase data signals (212, 214, 222), converted to an analog signal by a D/A converter (250), and low pass filtered (254) to generate the analog output signal (255). A single ROM (440) is utilized to implement all the look-up tables, multipliers, and adder. The all-digital implementation allows for precise control of the modulation index to $h=0.5\pm0.05$ percent over time, temperature, power levels, etc.

48 Claims, 3 Drawing Sheets

ALL-DIGITAL QUADRATURE MODULATOR

BACKGROUND OF THE INVENTION

The present invention generally relates to digital modulation techniques for land mobile radio systems, and, more particularly, to a method and apparatus for generating a continuous-phase frequency shift keyed (CPFSK) signal by the quadrature modulation of a radio frequency (RF) carrier with filtered, digital data using entirely digital methods.

CPFSK is a subset FSK in which the abrupt spectral transients generated by switching from one frequency to another in FSK are avoided by modulating the frequency of a single oscillator by the information bearing signal. Several constant-envelope CPFSK digital modulation techniques are known which provide spectrally efficient modulation for mobile radio system applications. Such techniques include Gaussian minimum shift keying (GMSK), tamed FM (TFM), and generalized tamed FM (GTFM). For any of these forms of constant-envelope digital modulation, coherent or non-coherent detection methods may be utilized. Although non-coherent detection methods are inherently less complex than coherent detection methods, non-coherent techniques exhibit inferior performance when utilized in mobile radio systems where Gaussian noise is additive over the radio channel, and where multipath effects cause intersymbol interference.

Employing coherent demodulation necessarily implies that some type of carrier recovery mechanism be made available in the receiver. Carrier recovery techniques for constant envelope coherent modulation methods fall into two broad classifications: carrier recovery methods for 'continuous' data transmissions; and carrier phase estimation methods for 'bursted' data transmissions. Both types of carrier recovery techniques require that the transmitter carrier frequency '$f_c$' and the transmitter modulation index 'h' (i.e., 2 times the peak deviation divided by the bit rate) be maintained invariant over time, temperature, and power levels.

For continuous data transmission, carrier recovery is usually achieved by an effective squaring operation which permits a carrier reference signal to be obtained directly from the received signal. For all the aforementioned modulation techniques which employ a modulation index of h=0.5, the squaring operation doubles the modulation index. The resultant signal exhibits spectral components at the carrier frequency $f_c$ plus-or-minus one-fourth the bit rate. Precise control of the modulation index is necessary, such that a viable carrier component will exist after the squaring operation. Examples of carrier recovery methods employing this technique include Costas loops, squaring loops, and various open loops.

For bursted data transmission, carrier recovery can be achieved by estimating the carrier phase from the received signal. The estimation is performed by correlating a local replica of a synchronization word with the identical sync word which has been embedded into each transmission burst. Bursted data transmission is preferred over continuous modulation for very high data rate (e.g., 250 kilobits-per-second) mobile radio systems, since a similar sync correlation operation is required in the bursted data carrier recovery process to adaptively equalize the channel to compensate for multipath effects.

The required tolerance on the modulation index for bursted data transmission at h=0.5 is given by the relationship:

$$\text{Tolerance} (\pm) = Y/\pi X$$

where Y is the maximum phase offset allowable at the transmitter (in radians), and X is the number of bits in the data burst. For example, if $Y = \pi/4$ radians and X=58 bits, then the tolerance on the modulation index h=0.5 would be ±0.4%. However, recent digital cellular system specifications require the maximum r.m.s. phase error to be 5 degrees (0.087 radians). Hence, using the same number of bits in the data burst, the modulation index must be h±0.5±0.05%. Needless to say, this is an extremely tight tolerance requirement.

Several methods are known for controlling the modulation index of a constant-envelope signal. One method utilizes a standard FM modulator with its deviation controlled through the use of a feedback loop. The feedback loop may incorporate a phase-locked loop, a discriminator for calibration purposes, and/or a deviation error detector with a modulation canceller. However, the use of a feedback loop in whatever form given above is presently only capable of controlling the modulation index to an accuracy of ±2%.

A second known method for controlling the modulation index for a constant-envelope signal includes the use of a serial minimum shift keying (MSK) transmitter consisting of a binary phase shift keying (BPSK) modulator and a precise bandpass filter. Such a method is only suitable for unfiltered MSK, since unfiltered MSK corresponds to linear modulation in the quadrature paths. Filtered MSK, however, does not have this property.

A third known method for transmitting a constant-envelope CPFSK signal having a controlled modulation index is to use an analog quadrature modulator to modulate an RF carrier. This method, while capable of adjusting the modulation index to within the tolerance necessary for a bursted communications system, nevertheless suffers from a number of disadvantages, i.e., the requirement of costly high-tolerance parts, frequent manual adjustments, excessive parts count, excessive current drain, etc. In order for an analog modulator to maintain amplitude balance, phase accuracy, and carrier leakage suppression within specification over all possible operating conditions at h=0.5, the modulation index tolerance is typically no better than ±0.5%.

SUMMARY OF THE INVENTION

Accordingly, it is a general object of the present invention to provide an improved implementation of a quadrature modulator which overcomes the disadvantages of the prior art.

It is another object of the present invention to provide a method and apparatus for quadrature modulating an RF carrier with filtered digital data utilizing entirely digital techniques, such that precise control of the modulation parameters can be readily maintained.

It is a particular object of the present invention to provide an improved method and means for generating a constant-envelope CPFSK signal while controlling the modulation index to within ±0.05% of h=0.5.

It is a further object of the present invention to provide an all-digital quadrature modulator for a radio transmitter that can be readily implemented using a minimum number of readily-available parts.

These and other objects are achieved by the present invention which, in brief, is a method and apparatus for quadrature modulating an RF carrier with filtered digital data to generate a CPFSK signal utilizing an all-digital implementation. In accordance with the invention, a continuous-phase frequency-shift keyed (CPFSK) signal is generated by quadrature modulating a radio frequency (RF) carrier with a digital input signal by the steps of: translating serial input data having a predetermined clock rate into parallel input data; determining the phase quadrant of the input serial data in response to the clock rate and the parallel input data, thereby providing a phase control signal; interpolating between data bits of the serial input data in response to the clock rate, thereby providing an interpolation signal; addressing a single read-only memory (ROM) utilizing the parallel input data, the phase control signal, and the interpolation signal; outputting a digital representation of a CPFSK signal from the memory; and subsequently converting the digital representation into an analog CPFSK output signal in a digital-to analog converter. An all-digital implementation in a single ROM is made possible by utilizing the interpolation signal to address the ROM, as opposed to utilizing separate in-phase(I) and quadrature-phase (Q) memories for both the carrier signal generation and the modulating signal generation.

The preferred embodiment of the invention is a GMSK quadrature modulator utilizing an all-digital implementation. The serial data input signal is formatted into parallel overlapping bits using a shift register, an up/down counter, and an interpolation counter, and applied as address lines to the single ROM. The ROM modulates the in-phase and quadrature-phase carrier components with the data components to provide the digital representation of the GMSK modulation signal. The digital GMSK signal from the ROM is then converted to an analog signal by a D/A converter, and low pass filtered to generate the analog GMSK output signal. Hence, a single ROM is utilized to implement all the look-up tables, multipliers, and adder.

The present invention permits precise control of all modulation parameters, including the modulation index, amplitude balance, phase accuracy, and carrier leakage suppression, such that a modulation index of $h = 0.5 \pm 0.05\%$ can be maintained over time, temperature, power levels, etc. Moreover, greatly improved dynamic range is also achieved, since the spectral noise floor essentially becomes a function of the number of bits of a single D/A converter at the output port. All of the functions, including the I and Q signal component look-up tables, the digital multiplication stages, and the addition stages, are implemented in a single ROM. This implementation technique not only reduces the complexity and current drain of the modulator, but also permits faster operation since the multiplication and addition steps are performed off-line in non-real time.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like-referenced numerals identify like elements, and in which:

DETAILED DESCRIPTION OF THE PREFERRED EMBODIMENT

Figure 1:
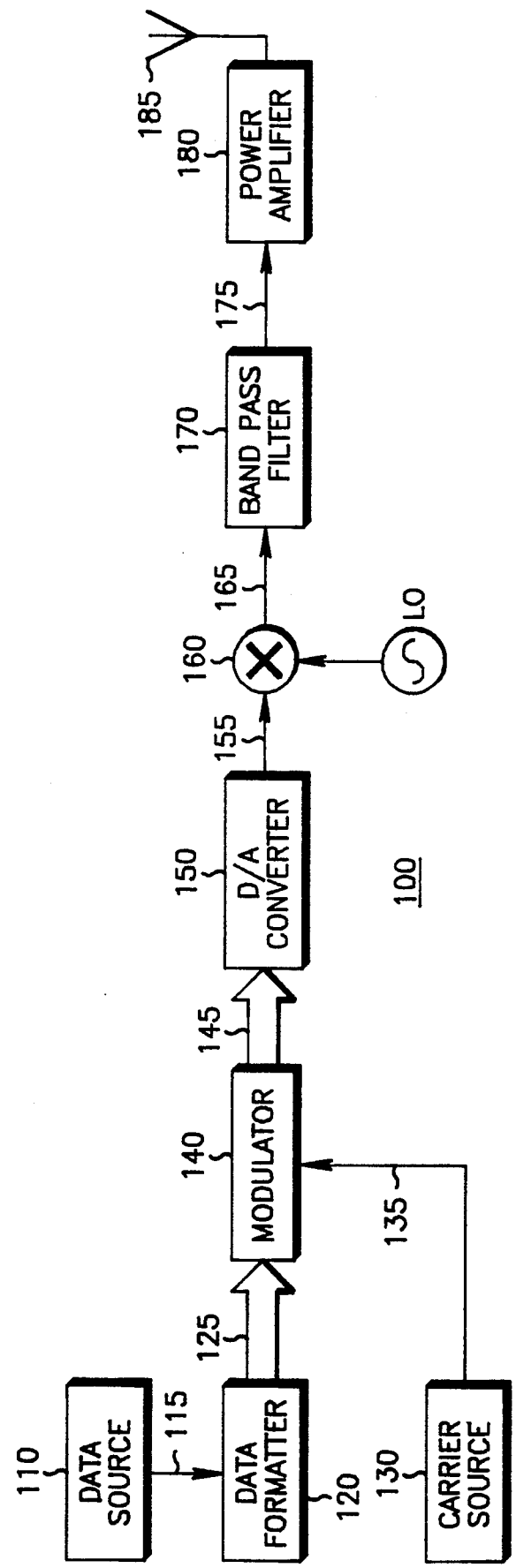
FIG. 1 is a general block diagram of a radio transmitter using the all-digital quadrature modulator according to the present invention.

FIG. 1 is a general block diagram of radio transmitter 100, illustrating how the CPFSK signal is produced. Data source 110 provides a serial bit stream at 115 which is used to modulate the RF carrier. The serial bit stream has a clock rate of 1/T, where T represents the clock period. Data source 110 typically provides a digitally-encoded voice or data signal. In signal. In the preferred embodiment, data source 110 is a digital signal processor which provides a time-division multiple access (TDMA) data signal at a clock rate of 270.833 kilobits-per-second (kbps).

Data formatter 120 is used to translate the serial bit stream at 115 into parallel data at 125. Formatter 120 utilizes the same clock rate signal to perform the serial-to-parallel translation. The following figures present a more detailed explanation of data formatter 120.

Carrier source 130 provides a radio frequency carrier signal $f_c$ at 135, which is to be modulated by the serial bit stream. In the present embodiment, carrier source 130 is a frequency synthesizer generating a mulitiple N of the carrier frequency at 1.0833 MHz.

Parallel data at 125, along with the carrier frequency signal at 135, is applied to modulator 140. Modulator 140 utilizes the parallel data to modulate the carrier frequency signal, thereby providing modulated data at 145. Modulator 140 employs the well-known technique of quadrature modulation, wherein the in-phase (I) component and the quadrature-phase (Q) component of the signals are generated and used to create the CPFSK signal. As will be shown below, a digital read-only memory (ROM) can be used to store instantaneous values of the I and Q components, such that the I and Q component values are obtained from a look-up table, and output via data bus 145.

The quadrature-modulated CPFSK digital data at 145 is then applied to digital-to-analog (D/A) converter 150, which generates an analog CPFSK signal at 155 at a multiple of the 1/T clock rate. In the preferred embodiment, an 8-bit D/A is utilized. Note that either a low-pass filter or a bandpass filter is typically used after the D/A converter to eliminate undesired spectral replicas of the modulated signal due to the sampling nature of the modulator.

The modulated analog CPFSK signal at 155 is then applied to mixer 160 which frequency translates the CPFSK signal to 901.0833 MHz by mixing the 1.0833 MHz CPFSK signal with the 900 MHz output of local oscillator 190. The 901.0833 MHz CPFSK signal 165 is subsequently bandpass filtered by filter 170, which removes the image signal (at 899 MHz) due to the mixing process. The frequency translated modulated analog CPFSK signal at 175 is then applied to power amplifier 180 for transmission via antenna 185. In the present embodiment, amplifier 180 is a class-C, 900 MHz, 20 watt power amplifier.

In order to explain the digital implementation of the present invention, the nature of a CPFSK signal must be understood. In general, any continuous-phase frequency shift keyed (CPFSK) signal s(t) may be expressed as:

$$s(t,d) = A \cos[\omega_c t + \theta(t,d)] \quad (1)$$

where:
d = input data vector,
A = amplitude of signal,
$\omega_c = 2\pi f_c$ = radian frequency of carrier, and
$\theta(t,d)$ = "excess" phase of signal, a function of time t and data vector d.

Dividing s(t,d) into quadrature components yields:

$$s(t,d) = I(t) \cos(\omega_c t) - Q(t) \sin(\omega_c t)$$

where $I(t) = \cos[\theta(t,d)]$ and $Q(t) = \sin[\theta(t,d)]$.

The excess phase $\theta(t,d)$ may be expressed as the sum of phase pulses q(t) weighted by the data values $d_i$ as:

$$\theta(t,d) = 2\pi h \sum_{i=-\infty}^{\infty} d_i q(t - iT) \quad (2)$$

where h is the modulation index.

It is generally assumed that for some integer L and a bit period T, q(t) is time limited, i.e., it satisfies the boundaries:

$$q(t) = \begin{cases} 0, & t \leq 0 \\ q(t), & 0 \leq t \leq LT \\ q(LT), & t \geq LT \end{cases} \quad (3)$$

Using equation 3 in equation 2, over the time period $nT \leq t < (n+1)T$, $\theta(t,d)$ can be expressed as:

$$\theta(t,d) = 2\pi h \sum_{i=-\infty}^{n} d_i q(t - iT). \quad (4)$$

which can be written as:

$$\theta(t,d) = 2\pi h \sum_{i=n-L+1}^{n} d_i q(t - iT) + 2\pi h \sum_{i=-\infty}^{n-L} d_i q(t - iT). \quad (5)$$

But for $i \leq (n-L)$:

$$q(nT - (n-L)T) = q(LT) \quad (6)$$
$$q((n+1)T - (n-L)T) = q((L+1)T)$$

and thus:

$$q(t - iT) = q(LT). \quad (7)$$

Let g(t) denote the frequency pulse corresponding to q(t), i.e.:

$$q(t) = \int_{-\infty}^{t} g(u) du. \quad (8)$$

For many forms of CPFSK of interest (notably GMSK, GTFM, etc.), g(t) may be approximated by a positive pulse. For such cases, it may be shown that:

$$q(LT) = \tfrac{1}{2}. \quad (9)$$

Substituting equations 6 and 9 into equation 5, we obtain for $nT \leq t < (n+1)T$:

$$\theta(t,d) = 2\pi h \sum_{i=n-L+1}^{n} d_i q(t - iT) + \pi h \sum_{i=-\infty}^{n-L} d_i. \quad (10)$$

Since phase is interpreted modulo $2\pi$, equation 10 can also be written as:

$$\theta(t,d) = 2\pi h \sum_{i=n-L+1}^{n} d_i q(t - iT) + \left[\pi h \sum_{i=-\infty}^{n-L} d_i \right] \mod 2\pi. \quad (11)$$

For a modulation index of $h = \tfrac{1}{2}$, equation 11 becomes:

$$\theta(t,d) = 2\pi h \sum_{i=n-L+1}^{n} d_i q(t - iT) + \left[\pi/2 \sum_{i=-\infty}^{n-L} d_i \right] \mod 2\pi$$

which is equal to:

$$2\pi h \sum_{i=n-L+1}^{n} d_i q(t - iT) + \psi_n, \quad (12)$$

where $$\psi_n = \left[\pi/2 \sum_{i=-\infty}^{n-L} d_i \right] \mod 2\pi.$$

For binary signaling, $d_i = \pm 1$, and hence the second term denoted by $\psi_n$ in equation 12 takes on only the four values 0, $\pi/2$, $\pi$, and $3\pi/2$.

Equation 12 thus takes on the following meaning: (1) the first term in equation 12 depends only upon the phase pulse q(t) and the L most recent data values $d_i$; and (2) the second term in equation 12, which is necessary to preserve phase continuity, is dependent only upon its value in the previous bit period $((n-1)T \leq t < nT)$ and the value of $d_i$ at time $i = n - L$. Hence this second term increments or decrements by $\pi/2$ from its previous value depending upon the value of $d_{n-L}$.

In order to digitally implement equation 12 in a ROM, the phase pulse q(t) must be interpolated to prevent sin x/x distortion after D/A conversion. Assuming M samples/bit period T, equation 12 may be written as:

$$\theta((n + m/M)T,d) = 2\pi h \sum_{i=n-L+1}^{n} d_i q((n + m/M)T - iT) + [\psi_{n-1} + \pi/2\, d_{n-L}] \mod 2\pi. \quad (13)$$

for $0 \leq m < M$ and $nT \leq t < (n+1)T$.

A baseband quadrature modulator which utilizes equation 13 for the value M = 16 can now be realized. From the observation made above regarding the second term of equation 12, the second term of equation 13 may be implemented by a 2-bit up/down counter with a step size of $\pi/2$.

In order to extend the ideas presented above to the present invention, let the carrier frequency $f_c = \omega_c/2\pi$ in equation 1 be a multiple of the bit rate 1/T, i.e.:

$$f_c = J/T. \tag{14}$$

for some real number J. A sampled version of s(t) in equation 1 may be expressed (with A=1) as:

$$s((n+m/M)T,d\ ) = \cos(\theta((n+m/M)T,d\ )\cos(2\pi(n+m/M)T\cdot J/T) - \sin(\theta((n+m/M)T,d\ ))\sin(2\pi(n+m/M)T\cdot J/T). \tag{15}$$

for $0 \leq m < M$ and $nT \leq t < (n+1)T$, where $\theta((n+m/M)T,d\ )$ is given by equation 13. Simplifying equation 15 yields:

$$s((n+m/M)T,d\ ) = \cos(\theta((n+m/M)T,d\ ))\cos(2\pi(n+m/M)J) - \sin(\theta((n+m/M)T,d\ ))\sin(2\pi(n+m/M)J). \tag{16}$$

Careful observation of equation 16 reveals that in order to make the carrier frequency $f_c$ independent of the discrete time index n (which is necessary to ensure that the resulting modulator is a finite state machine), it suffices to make J an integer. Hence the carrier frequency $f_c$ must be an integer multiple of the bit rate $1/T$, and equation 16 reduces to $$s((n+m/M)T,d\ ) = \cos(\theta((n+m/M)T,d\ ))\cos(2\pi Jm/M) - \sin(\theta((n+m/M)T,d\ ))\sin(2\pi Jm/M). \tag{17}$$

Because of the constraint on the phase continuity of $\theta(t,d\ )$ implied by the second term of equation 11, it suffices to prove that the multiplicative terms in equation 17, which are functions of $2\pi Jm/M$ only, are phase continuous around $m=0$. But note that:

$$2\pi J(M-1)/M = [2\pi J(-1)/M]\bmod 2\pi \tag{18}$$

which implies the phase continuity of equation 17 for all values of J.

Finally, note from equation 13 that $\theta((n+m/M)T,d\ )$ is independent of n explicitly, since the summation ranges from $q(m/M+L-1)$ to $q(m/M)$, and depends only on $d_{n-L}, d_{n-L+1}, \ldots, d_n$ and the value $\psi_{n-1}$.

Hence over the time interval $nT \leq t < (n+1)T$, $s(t,d\ )$ may be realized as a ROM with $L+\log_2 M + 2$ input address lines corresponding to : L current and previous data values $d_{n-L}, d_{n-L+1}, \ldots, d_n$, each data value taking on the value $\pm 1$; M values of the sequence 0, $1/M, 2/M, \ldots, M-1/M$, corresponding to $\log_2 M$ bits; and four values of the term $[\psi_{n-1} + \pi/2\ d_{n-L}] \bmod 2\pi$, which takes on the values 0, $\pi/2$, $\pi$, and $3\pi/2$, thus corresponding to 2 bits. The output of the ROM is a B-bit quantized version of $s(t,d\ )$. Hence the resulting ROM is of size $$2^{(L+\log_2 M+2)}B \text{ bits.}$$

Figure 2:
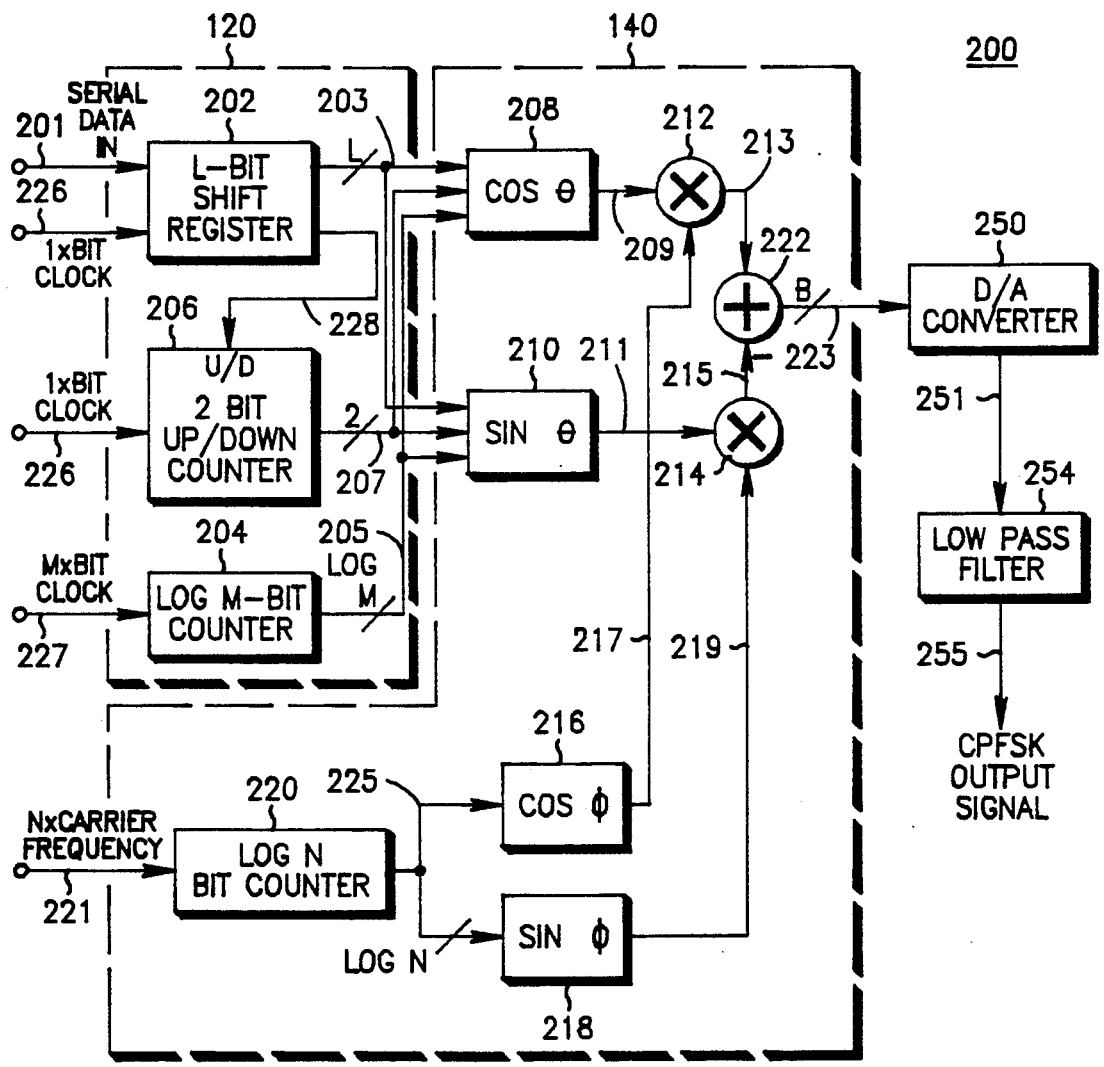
FIG. 2 is a detailed block diagram of a first embodiment of the all-digital quadrature modulator according to the present invention.

FIG. 2 illustrates a block diagram of all-digital quadrature modulator 200 in which the various terms of equation 17 have been implemented in digital hardware. A baseband quadrature modulator utilizes an in-phase (I) path and a quadrature-phase (Q) path to generate a baseband CPFSK signal at the carrier frequency $f_c$. Data formatter 120 includes L-bit shift register 202, 2-bit up/down counter 206, and $\log_2 M$-bit interpolation counter 204 as shown. Digital modulator 140 is comprised of four look-up table ROMs 208, 210, 216, 218, two digital multipliers 212, 214, a digital adder 222, and a carrier generator counter 220. These ROMs are employed to generate the filtered quadrature I and Q signal components to digital multipliers 212 and 214. The modulated I and Q signal components are then applied to digital adder 222. The output of adder 222 is fed to B-bit D/A converter 250, wherein the digitally-modulated carrier data is converted to an analog signal. This analog signal is then filtered by low pass filter 254, and then output as the analog CPFSK signal. This signal can then be applied to a class-C power amplifier without introducing extra out of band radiation.

In a digital implementation, the modulator requires overlapping bits for modulation. Therefore, shift register 202 performs the function of a memory for multiple bit times, such that as the serial data stream enters at 201, L=5 overlapping bits are provided in parallel at 203 to cosine $\theta$ ROM 208 and sine $\theta$ ROM 210. All possible I(t) and Q(t) shapes over T are stored in these ROMs which are addressed by shift register 202, counter 206, and counter 204.

As can be seen from equation 13, the difference in phase between two sampling times does not exceed $\pm \pi/2$ radian. The cross-over to another quadrant takes place at the sampling times. Within each quadrant, the phase path is completely determined by the impulse response truncated over five bit time periods. These phase shifts to the adjacent quadrant are performed by up/down counter 206. The up/down control at 228 is determined by the most significant output bit of shift register 202. The number of the quadrant is represented by the two output bits at 207.

Interpolation counter 204 is used to interpolate the filtered signals between bit times. Interpolation counter 204 has its input coupled to M=16 times the bit clock rate $1/T$. Its 4-bit output at 205 is also applied as address lines to the ROMs.

Carrier generator counter 220 is used to provide a $\log_2 N$ address at 225 to cosine $\phi$ ROM 216 and sine $\phi$ ROM 218. The input clock at 221 is N times the carrier frequency $f_c$. For example, when N=4, the input clock is 4.3332 MHz. The instantaneous values of $\cos \phi$ and $\sin \phi$ from the carrier ROMs are applied to multipliers 212 and 214 via lines 217 and 219, respectively.

Due to the entirely digital implementation of quadrature modulator 200, an extremely high accuracy tolerance can be achieved on the modulation index and other parameters. However, the drawbacks of this approach are the need for two multipliers, a digital adder, four ROMs, and carrier counter in addition to formatter 120. Depending on the particular application, the complexity and current drain associated with this configuration could be significant.

Figure 3:
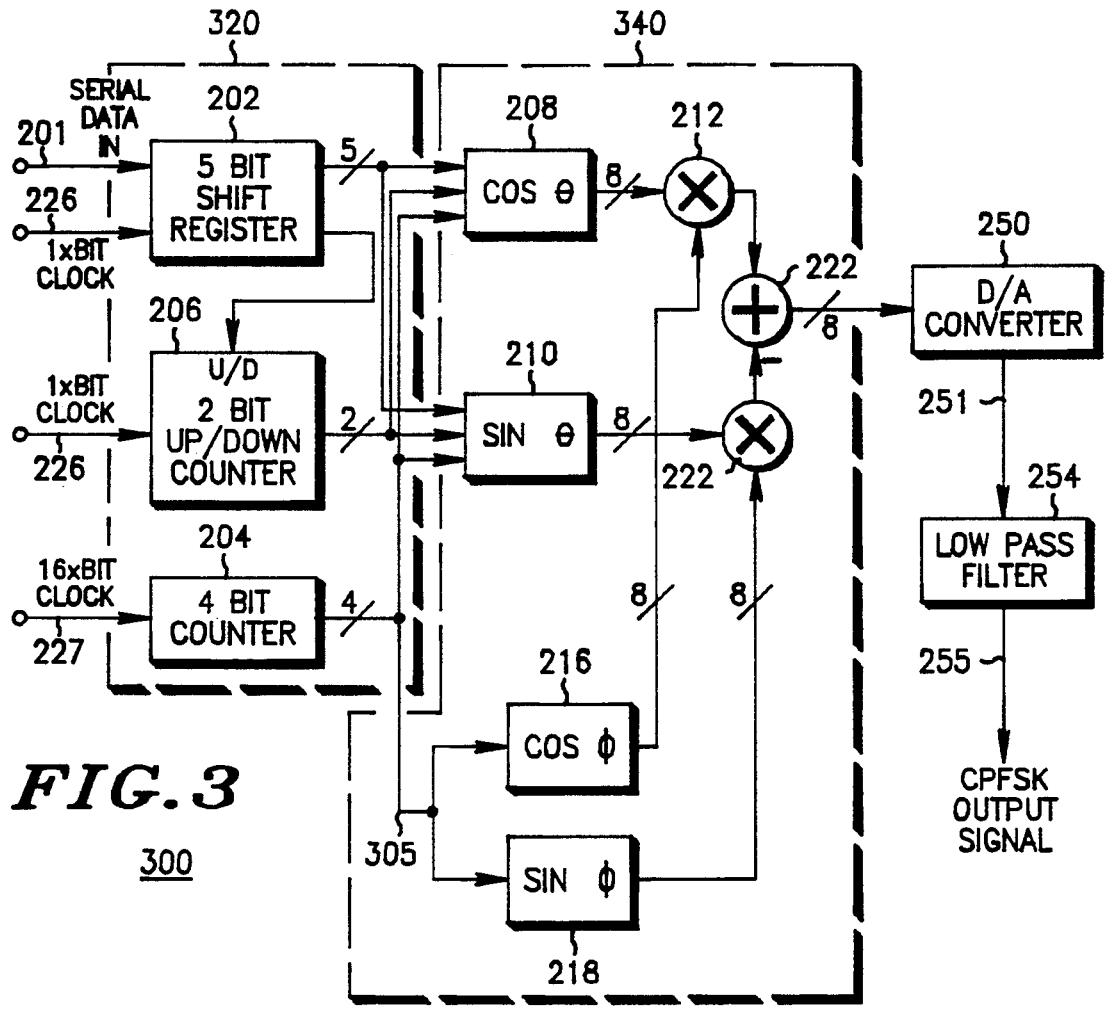
FIG. 3 is a second embodiment of the all-digital implementation of a quadrature modulator.

FIG. 3 illustrates all-digital quadrature modulator 300 in accordance with a second embodiment for the present invention. It must now be realized that carrier frequency ROMs 216 and 218 can be fed by a multiple of the bit clock at 305. Without this first realization, it would not be practical to use a single ROM look-up table to digitally implement the CPFSK signal. Futhermore, without this realization, only asynchronous operation could be achieved using a much greater overall ROM size. It must also be realized that the function of the digital multipliers and adders can be performed via a ROM look-up table. This second realization leads to the further advantages that a smaller overall ROM size can be used, and the digital calculations of the modulator can be performed off-line and stored in the ROM. Hence, the implementation of FIG. 3 follows from FIG. 2 by realizing that the function of log N bit counter 220 may be substituted in accordance with equation 17, and thus tying the address lines of quadrature carrier generator ROMs 216 and 218 to the output of interpolation counter 204 at 305. Note that when the quadrature carrier generator address lines are tied to the interpolation counter lines, the carrier frequency $f_c$ of the generated signals is an arbitrary integer J multiple of the bit rate.

Figure 4:
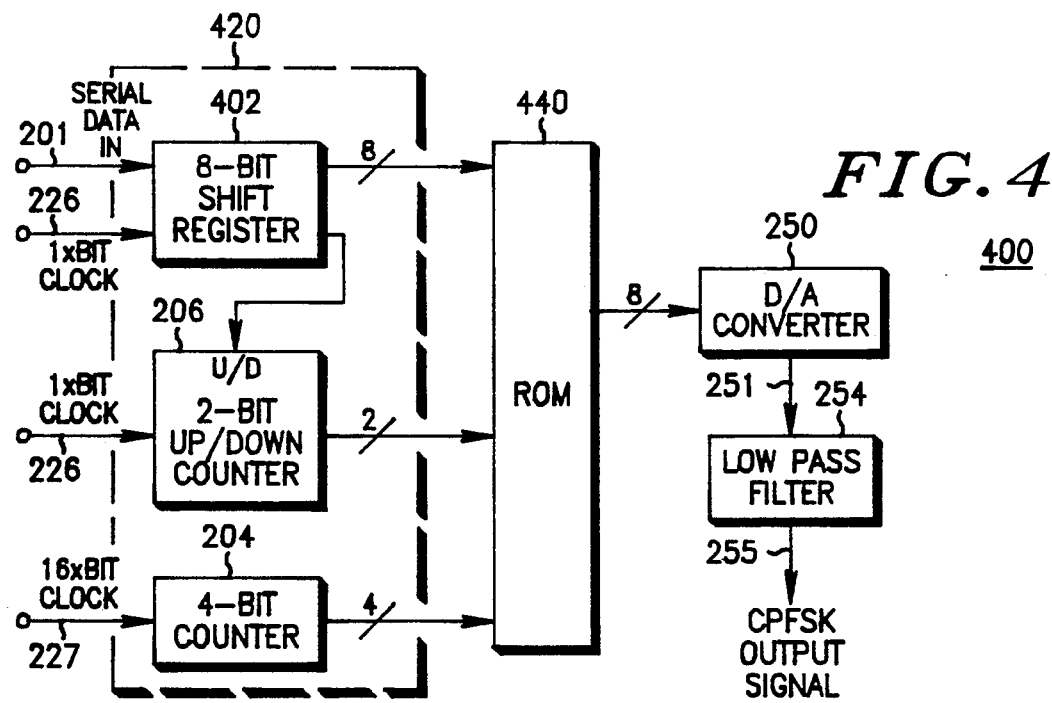
FIG. 4 is a third embodiment of the invention, illustrating the single-ROM implementation of the all-digital quadrature modulator.

FIG. 4, illustrating all-digital quadrature modulator 400, represents the third embodiment of the present invention. Note that the function of digital modulator 340 is performed by a single read-only memory 440. The function of cos $\theta$ ROM 208, sin $\theta$ ROM 210, cos $\phi$ ROM 216, sin $\phi$ ROM 218, digital multipliers 212 and 214, and digital adder 222 are all realized by a single ROM 440 with $L + \log_2 M + 2$ input address lines and B output lines, in accordance with equation 17.

The implementation of FIG. 4 utilizes readily available components for formatter 420 and ROM 440. Note also that 5-bit shift register 202 has been replaced by 8-bit shift register 402, strictly for ease of implementation. Shift register 402 may be a 74LS164, up/down counter 206 may be a 74LS169, interpolation counter 204 may be a 74LS163, and ROM 408 may be a 27256. D/A converter 250 may be implemented by a TRW1016J7. A KrohnHite 3202 filter was used for low-pass filter 254, but any low-pass filter or bandpass filter could be used to eliminate undesired spectral replicas of the modulated signal.

The following considerations could be taken into account for different implementations. Regarding the choice of oversampling factors M and J, note that equation 17 above is valid for any choice of integers M and J. However, taking various implementation considerations into account, certain choices of allowable ranges of M and J can be made. Some of these considerations (which are not mutually exclusive) follow:

1. $J < M/2$. This condition is necessary so that the Nyquist criterion for sampling is not violated. However, provided that aliasing does not occur, choosing $J > M/2$ could be employed to invert the spectrum of the modulated signal.

2. $J \leq 1$. This condition permits modulation of a non-zero frequency carrier.

3. Choose J such that $0 < J - Q$ and $J + Q < M/2$, where Q is the smallest integer such that $$10 \log_{10}\{[S(\{J+Q\}/T)]/S(0)\} < X(dB)$$

where S(f) is the power spectral density of s(t,d) and X is the desired spectral noise floor (in dB). For example, for $B_bT = 0.2-0.3$ GMSK, TFM, and GTFM having a tap coefficient value = 0.36, and roll-off factor = 0.62, $X < -40$ dB for $Q = 1$.

4. Choose the smallest value of J such that condition number 3 is satisfied. This ensures that the sin x/x distortion due to the zero-order hold characteristics of the D/A converter are minimized. Since the zero-order hold circuit is equivalent to a filter with a transfer function of:

$$H(j\omega) = e^{-j\omega T/2M}[2 \sin(\omega T/2M)/\omega]$$

the contribution of the zero-order hold circuit to the modulator spectrum is minimized for small carrier frequencies.

5. Choose the value of J such that the transition bands $$-(J-Q)/T < f < (J-Q)/T$$

and $$(J+Q)/T < f < (M-J-Q)/T$$

are maximized, where Q is given in condition number 3 above. This choice of J permits the use of the lowest order filters necessary to remove unwanted spectral replicas. Note that consideration of the first transition band becomes important when the digital quadrature modulator output is mixed up in frequency.

Regarding the choice of number of D/A output bits, note that as the number of output bits B is increased, the spectral noise floor decreases. In the preferred embodiment, utilizing M = 16, J = 4, L = 8, $B_bT = 0.3$ GMSK modulator, the noise floor decreased from $-60$ dB to $-100$ dB when the number of output bits is doubled from 8 to 16.

Once it is realized that the function of the elements of digital modulator 340 can be a function of the bit rate, that the entire modulator can be digitally implemented in a single ROM. Not only does this eliminate the excessive current drain of the discrete digital modulators, digital adder, and separate ROMs, but also the look-up table data for the single ROM can be computed off-line in non-real time. This permits significantly faster operation of the modulator.

The present invention readily permits precise control of the modulation index to be within the $h = 0.05 \pm 0.05$ percent specification. Moreover, accurate amplitude, phase, and carrier suppression is achieved. Greatly improved dynamic range is also possible, since the spectral noise floor is essentially made to be a function of the number of D/A converter output bits. Moreover, the present invention permits such precise control without the use of costly high-tolerance parts.

While only particular embodiments of the present invention have been shown and described herein, it will be obvious that further modifications may be made without departing from the invention in its broader aspects. For example, various other all-digital implementations could be devised utilizing other hardware devices, digital signal processors, or memory configurations. Accordingly, the claims are intended to cover all such changes and alternative constructions that fall within the true scope and spirit of the invention.

What is claimed is:

1. A digital modulator for generating a quadrature modulated signal, said modulator comprising:

first means for formatting an input data signal into a digital representation of in-phase (I) and quadrature-phase (Q) data signals, including first memory means for storing data and for providing said digital representation of said in-phase (I) and said quadrature-phase (Q) data signals in response to said input data signal;

means for providing a digital carrier signal representative of an integer multiple of a bit clock signal;

second means for formatting said digital carrier signal into a digital representation of in-phase (I) and quadrature-phase (Q) carrier signals, including second memory means for storing data and for providing said digital representation of said in-phase (I) and said quadrature-phase (Q) carrier signals in response to said digital carrier signal;

means, including said second memory means, for storing a digital representation of a quadrature modulated signal, and for providing said digital representation of said quadrature modulated signal in response to said in-phase (I) and quadrature-phase (Q) data signals and said in-phase (I) and quadrature-phase (Q) carrier signals; and means for converting said digital representation of said quadrature modulated signal into an analog output signal having a precise modulation index.

2. The modulator according to claim 1, wherein the functions of said first and second formatting means are performed using entirely digital electronic circuitry.

3. The modulator according to claim 1, wherein said first formatting means includes means for translating serial input data into parallel input data.

4. The modulator according to claim 1, wherein said second formatting means includes
means for providing a digital carrier signal representative of an integer multiple of said bit clock signal.

5. The modulator according to claim 1, wherein said modulator generates a continuous-phase frequency-shift keyed (CPFSK) signal.

6. The modulator according to claim 5, wherein said modulation index is $0.5 \pm 0.05\%$.

7. The modulator according to claim 1, wherein said modulator generates a Gaussian minimum shift keyed (GMSK) signal.

8. A digital quadrature modulator for generating a continuous-phase frequency-shift keyed (CPFSK) signal, said modulator comprising:
means for translating serial input data having a predetermined bit rate into parallel input data;
means for determining the phase quadrant of said serial input data in response to said bit rate and said parallel input data, thereby providing a phase control signal;
means for interpolating between data bits of said serial input data, thereby providing an interpolation signal; and
memory means for providing a digital representation of a CPFSK signal in response to said parallel input data, said phase control signal, and said interpolation signal.

9. The modulator according to claim 8, wherein said translating means includes an L-bit serial-to-parallel shift register into which said serial input data signal is clocked at a bit rate 1/T, thereby generating an L-bit parallel representation of said serial input data signal.

10. The modulator according to claim 9, wherein said phase quadrant determining means includes a 2-bit up-/down binary counter, wherein the up/down counter control is determined by the most-significant output bit of said shift register, and wherein said up/down counter is clocked at the bit rate 1/T.

11. The modulator according to claim 8, wherein said interpolating means includes a $\log_2 M$-bit binary counter clocked at M times the bit rate 1/T, thereby providing a parallel data word corresponding to the binary state of said $\log_2 M$-bit counter.

12. The modulator according to claim 8, wherein said memory means is a single read-only memory (ROM) addressed by said parallel input data, said phase control signal, and said interpolation signal.

13. The modulator according to claim 8, wherein said memory means provides a CPFSK signal with a modulation index of 0.5 at a carrier frequency of J/MT, wherein 1/T is the bit rate, wherein $J < M/2$, and wherein J and M are integers.

14. The modulator according to claim 8, further comprising means for converting said digital representation of said CPFSK signal into an analog CPFSK signal.

15. The modulator according to claim 14, wherein said converting means includes a digital-to-analog converter which provides an analog sampled data signal clocked at M times the bit rate 1/T, wherein M is an integer.

16. The modulator according to claim 14, wherein said converting means includes a filter to select the desired spectral replica from said analog sampled data signal, thereby providing said analog CPFSK signal.

17. A digital modulator for generating a quadrature modulated signal, said modulator comprising:
first means for transforming a serial data signal into a parallel data signal including first memory means for storing data and providing a digital representation of in-phase (I) and quadrature-phase (Q) data signals in response to said serial data signal;
means for providing a radio frequency (RF) carrier signal representative of an integer multiple of a bit clock signal;
second means for transforming said radio frequency (RF) carrier signal into a digital carrier signal including second memory means for storing data and for providing a digital representation of in-phase (I) and quadrature-phase (Q) carrier signals in response to said digital carrier signal;
means, including said second memory means, for digitally modulating said digital representation of I and Q carrier signals with said digital representation of I and Q data signals, thereby providing a digital representation of a quadrature modulated signal; and
means for converting said digital representation of said quadrature modulated signal into an analog output signal having a precise modulation index, whereby digital-to-analog conversion is performed subsequent to quadrature modulation.

18. The modulator according to claim 17, wherein the functions of said modulating means is performed using entirely digital electronic circuitry.

19. The modulator according to claim 17, wherein the functions of said first and second transforming means are performed using entirely digital electronic circuitry.

20. The modulator according to claim 17, wherein said first transforming means includes
means for translating serial input data into parallel input data.

21. The modulator according to claim 17, wherein said modulator generates a continuous-phase frequency-shift keyed (CPFSK) signal.

22. The modulator according to claim 21, wherein said modulation index is $0.5 \pm 0.05\%$.

23. A means for generating an analog continuous-phase frequency-shift keyed (CPFSK) signal s(t) by quadrature modulating a radio frequency (RF) carrier $f_c$ with an input signal d(t) utilizing entirely digital circuitry, comprising:
means for providing a data vector d of length L in response to d(t), wherein d has a bit rate 1/T;
means for determining a phase parameter of d(t) in response to d, thereby providing a phase signal $\theta(t, d)$;
means for providing an interpolation signal having a clock rate M/T;

memory means for providing a digital output signal s(t,d ) when addressed with d and said interpolation signal, where $$s(t,d\ ) = A\cos[\omega_c t + \theta(t,d\ )].$$

and where A=amplitude, and $\omega_c = 2\pi f_c$; and
means for converting s(t,d ) into s(t).

24. The CPFSK signal generating means according to claim 23, wherein said memory means includes pre-stored instantaneous values of s(t,d ).

25. The CPFSK signal generating means according to claim 23, wherein said phase parameter determining means includes means for determining the phase quadrant of d(t) in response to d , thereby providing phase signal ψ(t,d ), wherein said memory means is further addressed with said phase signal ψ(t,d ), and wherein $$\theta(t,d\ ) = 2\pi h \sum_{i=n-L+1}^{n} d_i q(t - T) + \psi_n$$

where h is the modulation index, and q(t) is the modulation phase pulse signal.

26. A digital quadrature modulator for generating a continuous-phase frequency-shift keyed (CPFSK) signal having a modulation index of 0.5 comprising:
a formatting circuit comprising:
an L-bit serial-to-parallel shift register into which a serial data signal is clocked at a bit rate 1/T, and which generates an L-bit parallel data signal representative of said serial data signal;
a 2-bit up/down binary counter, clocked at the bit rate 1/T, having its up/down counter control determined by the most significant bit of said parallel data signal, thereby providing a 2-bit phase state signal;
a $\log_2 M$-bit counter, clocked at M times the bit rate 1/T, which generates a $\log_2 M$-bit data interpolation signal representative of the binary state of said $\log_2 M$-bit counter;
a memory circuit comprising:
a memory device having $B2^{(L+\log_2 M+2)}$ storage locations, having address lines coupled to said parallel data signal, said phase state signal, and said data interpolation signal, having a B-bit output, and having stored therein representations of CPFSK signal data with a modulation index of 0.5 at a carrier frequency of J/MT where J<M/2, and J and M are integers.

27. The digital quadrature modulator according to claim 26, further comprising a digital-to-analog converter circuit which converts said B-bit CPFSK signal data into analog sampled-data representations of a CPFSK signal clocked at M times the bit rate 1/T.

28. The digital quadrature modulator according to claim 26, further comprising a filter circuit which selects the desired spectral replica of analog signals output from said converter circuit, thereby providing a CPFSK signal having a modulation index of 0.5 having a tolerance within ±0.05%.

29. A method for generating a continuous-phase frequency-shift keyed (CPFSK) signal by quadrature modulating a radio frequency (RF) carrier with a digital input signal utilizing entirely digital techniques, said method comprising the steps of:
translating serial input data having a predetermined bit rate into parallel input data;
determining the phase quadrant of said serial input data in response to said bit rate and said parallel input data, thereby providing a phase control signal;
interpolating between data bits of said serial input data, thereby providing an interpolation signal;
addressing a memory utilizing said parallel input data, said phase control signal, and said interpolation signal;
outputting a digital representation of a CPFSK signal from said memory; and converting said digital representation into an analog CPFSK output signal having a precise modulation index.

30. The method according to claim 29, wherein said translating step includes clocking said serial input data signal into an L-bit serial-to-parallel shift register at a bit rate 1/T, thereby generating an L-bit parallel representation of said serial input data signal.

31. The method according to claim 30, wherein said phase quadrant determining step includes clocking a 2-bit up/down binary counter at the bit rate 1/T, wherein the up/down counter control is determined by the most-significant output bit of said shift register.

32. The method according to claim 29, wherein said interpolating step includes clocking a $\log_2 M$-bit binary counter at M times the bit rate 1/T, thereby providing a parallel data word corresponding to the binary state of said $\log_2 M$-bit counter.

33. The method according to claim 29, wherein said memory means outputs a CPFSK signal with a modulation index of 0.5 at a carrier frequency of J/MT, wherein 1/T is the bit rate, wherein J<M/2, and wherein J and M are integers.

34. A method for generating a continuous-phase frequency-shift keyed (CPFSK) signal s(t) by a quadrature modulating a radio frequency (RF) carrier $f_c$ with a digital input signal d(t) utilizing entirely digital techniques, said method comprising the steps of:
(a) providing a data vector d of length L in response to d(t), wherein d has a bit rate 1/T;
(b) determining a phase parameter of d(t) in response to d , thereby providing a phase signal θ(t,d );
(c) providing an interpolation signal having a clock rate M/T;
(d) addressing a digital memory with d , θ(t,d ) and said interpolation signal; and
(e) outputting s(t,d ) from said digital memory, wherein $$s(t,d\ ) = A\cos[\omega_c t + \theta(t,d\ )]$$

and wherein A=amplitude and $\omega_c = 2\pi f_c$.

35. The method according to claim 34, further comprising the step of converting the digital signal s(t,d ) into an analog signal s(t).

36. The method according to claim 34, wherein said digital memory includes pre-stored instantaneous values of s(t,d ).

37. The method according to claim 34, wherein step (b) includes the step of determining the phase quadrant of d(t) in response to d , thereby providing phase signal ψ(t,d ).

38. The method according to claim 37, wherein $$\theta(t,d\ ) = 2\pi h \sum_{i=n-L+1}^{n} d_i q(t - T) + \psi_n$$

UNITED STATES PATENT AND TRADEMARK OFFICE
CERTIFICATE OF CORRECTION

PATENT NO. : 5,121,412

DATED : June 9, 1992

INVENTOR(S) : David E. Borth

It is certified that error appears in the above-identified patent and that said Letters Patent is hereby corrected as shown below:

Columns 1 - 16 should be deleted and replace with the attached columns 1-16.

Signed and Sealed this

Sixth Day of December, 1994

Attest:

BRUCE LEHMAN

Attesting Officer

Commissioner of Patents and Trademarks

ALL-DIGITAL QUADRATURE MODULATOR

BACKGROUND OF THE INVENTION

The present invention generally relates to digital modulation techniques for land mobile radio systems, and, more particularly, to a method and apparatus for generating a continuous-phase frequency shift keyed (CPFSK) signal by the quadrature modulation of a radio frequency (RF) carrier with filtered, digital data using entirely digital methods.

CPFSK is a subset FSK in which the abrupt spectral transients generated by switching from one frequency to another in FSK are avoided by modulating the frequency of a single oscillator by the information bearing signal. Several constant-envelope CPFSK digital modulation techniques are known which provide spectrally efficient modulation for mobile radio system applications. Such techniques include Gaussian minimum shift keying (GMSK), tamed FM (TFM), and generalized tamed FM (GTFM). For any of these forms of constant-envelope digital modulation, coherent or non-coherent detection methods may be utilized. Although non-coherent detection methods are inherently less complex than coherent detection methods, non-coherent techniques exhibit inferior performance when utilized in mobile radio systems where Gaussian noise is additive over the radio channel, and where multipath effects cause intersymbol interference.

Employing coherent demodulation necessarily implies that some type of carrier recovery mechanism be made available in the receiver. Carrier recovery techniques for constant envelope coherent modulation methods fall into two broad classifications: carrier recovery methods for 'continuous' data transmissions; and carrier phase estimation methods for 'bursted' data transmissions. Both types of carrier recovery techniques require that the transmitter carrier frequency '$f_c$' and the transmitter modulation index 'h' (i.e., 2 times the peak deviation divided by the bit rate) be maintained invariant over time, temperature, and power levels.

For continuous data transmission, carrier recovery is usually achieved by an effective squaring operation which permits a carrier reference signal to be obtained directly from the received signal. For all the aforementioned modulation techniques which employ a modulation index of h=0.5, the squaring operation doubles the modulation index. The resultant signal exhibits spectral components at the carrier frequency $f_c$ plus-or-minus one-fourth the bit rate. Precise control of the modulation index is necessary, such that a viable carrier component will exist after the squaring operation. Examples of carrier recovery methods employing this technique include Costas loops, squaring loops, and various open loops.

For bursted data transmission, carrier recovery can be achieved by estimating the carrier phase from the received signal. The estimation is performed by correlating a local replica of a synchronization word with the identical sync word which has been embedded into each transmission burst. Bursted data transmission is preferred over continuous modulation for very high data rate (e.g., 250 kilobits-per-second) mobile radio systems, since a similar sync correlation operation is required in the bursted data carrier recovery process to adaptively equalize the channel to compensate for multipath effects.

The required tolerance on the modulation index for bursted data transmission at h=0.5 is given by the relationship:

$$\text{Tolerance } (\pm) = Y/\pi X$$

where Y is the maximum phase offset allowable at the transmitter (in radians), and X is the number of bits in the data burst. For example, if $Y = \pi/4$ radians and X=58 bits, then the tolerance on the modulation index h=0.5 would be ±0.4%. However, recent digital cellular system specifications require the maximum r.m.s. phase error to be 5 degrees (0.087 radians). Hence, using the same number of bits in the data burst, the modulation index must be h=0.5±0.05%. Needless to say, this is an extremely tight tolerance requirement.

Several methods are known for controlling the modulation index of a constant-envelope signal. One method utilizes a standard FM modulator with its deviation controlled through the use of a feedback loop. The feedback loop may incorporate a phase-locked loop, a discriminator for calibration purposes, and/or a deviation error detector with a modulation canceller. However, the use of a feedback loop in whatever form given above is presently only capable of controlling the modulation index to an accuracy of ±2%.

A second known method for controlling the modulation index for a constant-envelope signal includes the use of a serial minimum shift keying (MSK) transmitter consisting of a binary phase shift keying (BPSK) modulator and a precise bandpass filter. Such a method is only suitable for unfiltered MSK, since unfiltered MSK corresponds to linear modulation in the quadrature paths. Filtered MSK, however, does not have this property.

A third known method for transmitting a constant-envelope CPFSK signal having a controlled modulation index is to use an analog quadrature modulator to modulate an RF carrier. This method, while capable of adjusting the modulation index to within the tolerance necessary for a bursted communications system, nevertheless suffers from a number of disadvantages, i.e., the requirement of costly high-tolerance parts, frequent manual adjustments, excessive parts count, excessive current drain, etc. In order for an analog modulator to maintain amplitude balance, phase accuracy, and carrier leakage suppression within specification over all possible operating conditions at h=0.5, the modulation index tolerance is typically no better than ±0.5%.

SUMMARY OF THE INVENTION

Accordingly, it is a general object of the present invention to provide an improved implementation of a quadrature modulator which overcomes the disadvantages of the prior art.

It is another object of the present invention to provide a method and apparatus for quadrature modulating an RF carrier with filtered digital data utilizing entirely digital techniques, such that precise control of the modulation parameters can be readily maintained.

It is a particular object of the present invention to provide an improved method and means for generating a constant-envelope CPFSK signal while controlling the modulation index to within ±0.05% of h=0.5.

It is a further object of the present invention to provide an all-digital quadrature modulator for a radio transmitter that can be readily implemented using a minimum number of readily-available parts.

These and other objects are achieved by the present invention which, in brief, is a method and apparatus for quadrature modulating an RF carrier with filtered digital data to generate a CPFSK signal utilizing an all-digital implementation. In accordance with the invention, a continuous-phase frequency-shift keyed (CPFSK) signal is generated by quadrature modulating a radio frequency (RF) carrier with a digital input signal by the steps of: translating serial input data having a predetermined clock rate into parallel input data; determining the phase quadrant of the input serial data in response to the clock rate and the parallel input data, thereby providing a phase control signal; interpolating between data bits of the serial input data in response to the clock rate, thereby providing an interpolation signal; addressing a single read-only memory (ROM) utilizing the parallel input data, the phase control signal, and the interpolation signal; outputting a digital representation of a CPFSK signal from the memory; and subsequently converting the digital representation into an analog CPFSK output signal in a digital-to-analog converter. An all-digital implementation in a single ROM is made possible by utilizing the interpolation signal to address the ROM, as opposed to utilizing separate in-phase(I) and quadrature-phase (Q) memories for both the carrier signal generation and the modulating signal generation.

The preferred embodiment of the invention is a GMSK quadrature modulator utilizing an all-digital implementation. The serial data input signal is formatted into parallel overlapping bits using a shift register, an up/down counter, and an interpolation counter, and applied as address lines to the single ROM. The ROM modulates the in-phase and quadrature-phase carrier components with the data components to provide the digital representation of the GMSK modulation signal. The digital GMSK signal from the ROM is then converted to an analog signal by a D/A converter, and low pass filtered to generate the analog GMSK output signal. Hence, a single ROM is utilized to implement all the look-up tables, multipliers, and adder.

The present invention permits precise control of all modulation parameters, including the modulation index, amplitude balance, phase accuracy, and carrier leakage suppression, such that a modulation index of $h = 0.5 \pm 0.05\%$ can be maintained over time, temperature, power levels, etc. Moreover, greatly improved dynamic range is also achieved, since the spectral noise floor essentially becomes a function of the number of bits of a single D/A converter at the output port. All of the functions, including the I and Q signal component look-up tables, the digital multiplication stages, and the addition stages, are implemented in a single ROM. This implementation technique not only reduces the complexity and current drain of the modulator, but also permits faster operation since the multiplication and addition steps are performed off-line in non-real time.

BRIEF DESCRIPTION OF THE DRAWINGS

The features of the present invention which are believed to be novel are set forth with particularity in the appended claims. The invention, together with further ojects and advantages thereof, may best be understood by reference to the following description taken in conjunction with the accompanying drawings, in the several figures of which like-referenced numerals identify like elements, and in which:

FIG. 1 a general block diagram of a radio transmitter using the all-digital quadrature modulator according to the present invention;

FIG. 2 is a detailed block diagram of a first embodiment of the all-digital quadrature modulator according to the present invention;

FIG. 3 is a second embodiment of the all-digital implementation of a quadrature modulator; and FIG. 4 is a third embodiment of the invention, illustrating the single-ROM implementation of the all-digital quadrature modulator.

DETAILED DESCRIPTION OF THE PREFERRED EMBODIMENT

FIG. 1 is a general block diagram of radio transmitter 100, illustrating how the CPFSK signal is produced. Data source 110 provides a serial bit stream at 115 which is used to modulate the RF carrier. The serial bit stream has a clock rate of $1/T$, where T represents the clock period. Data source 110 typically provides a digitally-encoded voice or data signal. In signal. In the preferred embodiment, data source 110 is a digital signal processor which provides a time-division multiple access (TDMA) data signal at a clock rate of 270.833 kilobits-per-second (kbps).

Data formatter 120 is used to translate the serial bit stream at 115 into parallel data at 125. Formatter 120 utilizes the same clock rate signal to perform the serial-to-parallel translation. The following figures present a more detailed explanation of data formatter 120.

Carrier source 130 provides a radio frequency carrier signal $f_c$ at 135, which is to be modulated by the serial bit stream. In the present embodiment, carrier source 130 is a frequency synthesizer generating a multiple N of the carrier frequency at 1.0833 MHz.

Parallel data at 125, along with the carrier frequency signal at 135, is applied to modulator 140. Modulator 140 utilizes the parallel data to modulate the carrier frequency signal, thereby providing modulated data at 145. Modulator 140 employs the well-known technique of quadrature modulation, wherein the in-phase (I) component and the quadrature-phase (Q) component of the signals are generated and used to create the CPFSK signal. As will be shown below, a digital read-only memory (ROM) can be used to store instantaneous values of the I and Q components, such that the I and Q component values are obtained from a look-up table, and output via data bus 145.

The quadrature-modulated CPFSK digital data at 145 is then applied to digital-to-analog (D/A) converter 150, which generates an analog CPFSK signal at 155 at a multiple of the $1/T$ clock rate. In the preferred embodiment, an 8-bit D/A is utilized. Note that either a low-pass filter or a bandpass filter is typically used after the D/A converter to eliminate undesired spectral replicas of the modulated signal due to the sampling nature of the modulator.

The modulated analog CPFSK signal at 155 is then applied to mixer 160 which frequency translates the CPFSK signal to 901.0833 MHz by mixing the 1.0833 MHz CPFSK signal with the 900 MHz output of local oscillator 190. The 901.0833 MHz CPFSK signal 165 is subsequently bandpass filtered by filter 170, which removes the image signal (at 899 MHz) due to the mixing process. The frequency translated modulated analog CPFSK signal at 175 is then applied to power amplifier 180 for transmission via antenna 185. In the present embodiment, amplifier 180 is a class-C, 900 MHz, 20 watt power amplifier.

In order to explain the digital implementation of the present invention, the nature of a CPFSK signal must be understood. In general, any continuous-phase frequency shift keyed (CPFSK) signal s(t) may be expressed as:

$$s(t, d\wedge) = A \cos[\omega_c t + \theta(t, d\wedge)] \quad (1)$$

where:
 $d\wedge$ = input data vector,
 A = amplitude of signal,
 $\omega_c = 2\pi f_c$ = radian frequency of carrier, and
 $\theta(t, d\wedge)$ = "excess" phase of signal, a function of time t and data vector $d\wedge$.

Dividing $s(t, d\wedge)$ into quadrature components yields:

$$s(t, d\wedge) = I(t) \cos(\omega_c t) - Q(t) \sin(\omega_c t)$$

where $I(t) = \cos[\theta(t, d\wedge)]$ and $Q(t) = \sin[\theta(t, d\wedge)]$.

The excess phase $\theta(t, d\wedge)$ may be expressed as the sum of phase pulses q(t) weighted by the data values $d_i$ as:

$$\theta(t, d\wedge) = 2\pi h \sum_{i=-\infty}^{\infty} d_i \, q(t - iT) \quad (2)$$

where h is the modulation index.

It is generally assumed that for some integer L and a bit period T, q(t) is time limited, i.e., it satisfies the boundaries:

$$q(t) = \begin{cases} 0, & t \leq 0 \\ q(t), & 0 \leq t \leq LT \\ q(LT), & t \geq LT. \end{cases} \quad (3)$$

Using equation 3 in equation 2, over the time period $nT < t < (n+1)T$, $\theta(t, d\wedge)$ can be expressed as:

$$\theta(t, d\wedge) = 2\pi h \sum_{i=-\infty}^{n} d_i \, q(t - iT). \quad (4)$$

which can be written as:

$$\theta(t, d\wedge) = 2\pi h \sum_{i=n-L+1}^{n} d_i \, q(t-iT) + 2\pi h \sum_{i=-\infty}^{n-L} d_i \, q(t-iT). \quad (5)$$

But for $i \leq (n-L)$:

$$q(nT - (n-L)T) = q(LT) \quad (6)$$
$$q((n+1)T - (n-L)T) = q((L+1)T)$$

and thus:

$$q(t - iT) = q(LT). \quad (7)$$

Let g(t) denote the frequency pulse corresponding to q(t), i.e.:

$$q(t) = \int_{-\infty}^{t} g(u) \, du. \quad (8)$$

For many forms of CPFSK of interest (notably GMSK, GTFM, etc.), g(t) may be approximated by a positive pulse. For such cases, it may be shown that:

$$q(LT) = 1/2. \quad (9)$$

Substituting equations 6 and 9 into equation 5, we obtain for $nT < t < (n+1)T$:

$$\theta(t, d\wedge) = 2\pi h \sum_{i=n-L+1}^{n} d_i \, q(t-iT) + \pi h \sum_{i=-\infty}^{n-L} d_i. \quad (10)$$

Since phase is interpreted modulo $2\pi$, equation 10 can also be written as:

$$\theta(t, d\wedge) = 2\pi h \sum_{i=n-L+1}^{n} d_i \, q(t-iT) + [\pi h \sum_{i=-\infty}^{n-L} d_i] \bmod 2\pi. \quad (11)$$

For a modulation index of $h = \frac{1}{2}$, equation 11 becomes:

$$\theta(t, d\wedge) = 2\pi h \sum_{i=n-L+1}^{n} d_i \, q(t-iT) + [\pi/2 \sum_{i=-\infty}^{n-L} d_i] \bmod 2\pi$$

which is equal to:

$$2\pi h \sum_{i=n-L+1}^{n} d_i \, q(t-iT) + \psi_n. \quad (12)$$

where $$\psi_n = [\pi/2 \sum_{i=-\infty}^{n-L} d_i] \bmod 2\pi.$$

For binary signaling, $d_i = \pm 1$, and hence the second term denoted by $\psi_n$ in equation 12 takes on only the four values 0, $\pi/2$, $\pi$, and $3\pi/2$.

Equation 12 thus takes on the following meaning: (1) the first term in equation 12 depends only upon the phase pulse q(t) and the L most recent data values $d_i$; and (2) the second term in equation 12, which is necessary to preserve phase continuity, is dependent only upon its value in the previous bit period $((n-1)T < t < nT)$ and the value of $d_i$ at time $i = n-L$. Hence this second term increments or decrements by $\pi/2$ from its previous value depending upon the value of $d_{n-L}$.

In order to digitally implement equation 12 in a ROM, the phase pulse q(t) must be interpolated to prevent sin x/x distortion after D/A conversion. Assuming M samples/bit period T, equation 12 may be written as:

$$\theta((n+m/M)T, d\wedge) = 2\pi h \sum_{i=n-L+1}^{n} d_i \, q((n+m/M)T - iT) + [\psi_{n-1} + \pi/2 \, d_{n-L}] \bmod 2\pi. \quad (13)$$

for $0 \leq m < M$ and $nT \leq t < (n+1)T$.

A baseband quadrature modulator which utilizes equation 13 for the value M = 16 can now be realized. From the observation made above regarding the second term of equation 12, the second term of equation 13 may be implemented by a 2-bit up/down counter with a step size of $\pi/2$.

In order to extend the ideas presented above to the present invention, let the carrier frequency $f_c = \omega_c/2\pi$ in equation 1 be a multiple of the bit rate 1/T, i.e.:

$$f_c = J/T. \tag{14}$$

for some real number J. A sampled version of s(t) in equation 1 may be expressed (with A=1) as:

$$s((n+m/M)T,d\wedge) = \cos(\theta((n+m/M)T,d\wedge))\cos(2\pi(n+m/M)T\cdot J/T) - \sin(\theta((n+m/M)T,d\wedge))\sin(2\pi(n+m/M)T\cdot J/T), \tag{15}$$

for $0 \leq m < M$ and $nT \leq t < (n+1)T$, where $\theta((n+m/M)T,d\wedge)$ is given by equation 13. Simplifying equation 15 yields:

$$s((n+m/M)T,d\wedge) = \cos(\theta((n+m/M)T,d\wedge))\cos(2\pi(n+m/M)J) - \sin(\theta((n+m/M)T,d\wedge))\sin(2\pi(n+m/M)J). \tag{16}$$

Careful observation of equation 16 reveals that in order to make the carrier frequency $f_c$ independent of the discrete time index n (which is necessary to ensure that the resulting modulator is a finite state machine), it suffices to make J an integer. Hence the carrier frequency $f_c$ must be an integer multiple of the bit rate 1/T, and equation 16 reduces to $$s((n+m/M)T,d\wedge) = \cos(\theta((n+m/M)T,d))\cos(2\pi Jm/M) - \sin(\theta((n+m/M)T,d\wedge))\sin(2\pi Jm/M). \tag{17}$$

Because of the constraint on the phase continuity of $\theta(t,d\wedge)$ implied by the second term of equation 11, it suffices to prove that the multiplicative terms in equation 17, which are functions of $2\pi Jm/M$ only, are phase continuous around m=0. But note that:

$$2\pi J(M-1)/M = [2\pi J(-1)/M] \bmod 2\pi \tag{18}$$

which implies the phase continuity of equation 17 for all values of J.

Finally, note from equation 13 that $\theta((n+m/M)T,d\wedge)$ is independent of n explicitly, since the summation ranges from $q(m/M+L-1)$ to $q(m/M)$, and depends only on $d_{n-L}, d_{n-L+1}, \ldots, d_n$ and the value $\Psi_{n-1}$.

Hence over the time interval $nT \leq t < (n+1)T$, $s(t,d\wedge)$ may be realized as a ROM with $L+\log_2 M+2$ input address lines corresponding to: L current and previous data values $d_{n-L}, d_{n-L+1}, \ldots, d_n$, each data value taking on the value $\pm 1$; M values of the sequence $0, 1/M, 2/M, \ldots, M-1/M$, corresponding to $\log_2 M$ bits; and four values of the term $[\varphi_{n-1} + \pi/2 \, d_{n-L}] \bmod 2\pi$, which takes on the values $0, \pi/2, \pi$, and $3\pi/2$, thus corresponding to 2 bits. The output of the ROM is a B-bit quantized version of $s(t,d\wedge)$. Hence the resulting ROM is of size.

$$2^{(L+\log_2 M+2)} \cdot B \text{ bits.}$$

FIG. 2 illustrates a block diagram of all-digital quadrature modulator 200 in which the various terms of equation 17 have been implemented in digital hardware. A baseband quadrature modulator utilizes an in-phase (I) path and a quadrature-phase (Q) path to generate a baseband CPFSK signal at the carrier frequency $f_c$. Data formatter 120 includes L-bit shift register 202, 2-bit up/down counter 206, and $\log_2 M$-bit interpolation counter 204 as shown. Digital modulator 140 is comprised of four look-up table ROMs 208, 210, 216, 218, two digital multipliers 212, 214, a digital adder 222, and a carrier generator counter 220. These ROMs are employed to generate the filtered quadrature I and Q signal components to digital multipliers 212 and 214. The modulated I and Q signal components are then applied to digital adder 222. The output of adder 222 is fed to B-bit D/A converter 250, wherein the digitally-modulated carrier data is converted to an analog signal. This analog signal is then filtered by low pass filter 254, and then output as the analog CPFSK signal. This signal can then be applied to a class-C power amplifier without introducing extra out of band radiation.

In a digital implementation, the modulator requires overlapping bits for modulation. Therefore, shift register 202 performs the function of a memory for multiple bit times, such that as the serial data stream enters at 201, L=5 overlapping bits are provided in parallel at 203 to cosine $\theta$ ROM 208 and sine $\theta$ ROM 210. All possible I(t) and Q(t) shapes over T are stored in these ROMs which are addressed by shift register 202, counter 206, and counter 204.

As can be seen from equation 13, the difference in phase between two sampling times does not exceed $\pm \pi/2$ radian. The cross-over to another quadrant takes place at the sampling times. Within each quadrant, the phase path is completely determined by the impulse response truncated over five bit time periods. These phase shifts to the adjacent quadrant are performed by up/down counter 206. The up/down control at 228 is determined by the most significant output bit of shift register 202. The number of the quadrant is represented by the two output bits at 207.

Interpolation counter 204 is used to interpolate the filtered signals between bit times. Interpolation counter 204 has its input coupled to M=16 times the bit clock rate 1/T. Its 4-bit output at 205 is also applied as address lines to the ROMs.

Carrier generator counter 220 is used to provide a $\log_2 N$ address at 225 to cosine $\phi$ ROM 216 and sine $\phi$ ROM 218. The input clock at 221 is N times the carrier frequency $f_c$. For example, when N=4, the input clock is 4.3332 MHz. The instantaneous values of $\cos \phi$ and $\sin \phi$ from the carrier ROMs are applied to multipliers 212 and 214 via lines 217 and 219, respectively.

Due to the entirely digital implementation of quadrature modulator 200, an extremely high accuracy tolerance can be achieved on the modulation index and other parameters. However, the drawbacks of this approach are the need for two multipliers, a digital adder, four ROMs, and carrier counter in addition to formatter 120. Depending on the particular application, the complexity and current drain associated with this configuration could be significant.

FIG. 3 illustrates all-digital quadrature modulator 300 in accordance with a second embodiment for the present invention. It must now be realized that carrier frequency ROMs 216 and 218 can be fed by a multiple of the bit clock at 305. Without this first realization, it would not be practical to use a single ROM look-up table to digitally implement the CPFSK signal. Furthermore, without this realization, only asynchronous operation could be achieved using a much greater overall ROM size. It must also be realized that the function of the digital multipliers and adders can be performed via a ROM look-up table. This second realization leads to the further advantages that a smaller overall ROM size can be used, and the digital calculations of the modulator can be performed off-line and stored in the ROM. Hence, the implementation of FIG. 3 follows from FIG. 2 by realizing that the function of log N bit counter 220 may be substituted in accordance with equation 17, and thus tying the address lines of quadrature carrier generator ROMs 216 and 218 to the output of interpolation counter 204 at 305. Note that when the quadrature carrier generator address lines are tied to the interpolation counter lines, the carrier frequency $f_c$ of the generated signals is an arbitrary integer J multiple of the bit rate.

FIG. 4, illustrating all-digital quadrature modulator 400, represents the third embodiment of the present invention. Note that the function of digital modulator 340 is performed by a single read-only memory 440. The function of $\cos \theta$ ROM 208, $\sin \theta$ ROM 210, $\cos \phi$ ROM 216, $\sin \phi$ ROM 218, digital multipliers 212 and 214, and digital adder 222 are all realized by a single ROM 440 with $L + \log_2 M + 2$ input address lines and B output lines, in accordance with equation 17.

The implementation of FIG. 4 utilizes readily available components for formatter 420 and ROM 440. Note also that 5-bit shift register 202 has been replaced by 8-bit shift register 402, strictly for ease of implementation. Shift register 402 may be a 74LS164, up/down counter 206 may be a 74LS169, interpolation counter 204 may be a 74LS163, and ROM 408 may be a 27256. D/A converter 250 may be implemented by a TRW1016J7. A KrohnHite 3202 filter was used for low-pass filter 254, but any low-pass filter or bandpass filter could be used to eliminate undesired spectral replicas of the modulated signal.

The following considerations could be taken into account for different implementations. Regarding the choice of oversampling factors M and J, note that equation 17 above is valid for any choice of integers M and J. However, taking various implementation considerations into account, certain choices of allowable ranges of M and J can be made. Some of these considerations (which are not mutually exclusive) follow:

1. $J < M/2$. This condition is necessary so that the Nyquist criterion for sampling is not violated. However, provided that aliasing does not occur, choosing $J > M/2$ could be employed to invert the spectrum of the modulated signal.

2. $J \leq 1$. This condition permits modulation of a non-zero frequency carrier.

3. Choose J such that $0 < J - Q$ and $J + Q < M/2$, where Q is the smallest integer such that $$10 \log_{10}\{[S(\{J+Q\}/T)]/S(0)\} < X(dB)$$

where S(f) is the power spectral density of s(t,d ) and X is the desired spectral noise floor (in dB). For example, for $B_bT = 0.2$–0.3 GMSK, TFM, and GTFM having a tap coefficient value = 0.36, and roll-off factor = 0.62, $X < +40$ dB for Q = 1.

4. Choose the smallest value of J such that condition number 3 is satisified. This ensures that the sin x/x distortion due to the zero-order hold characteristics of the D/A converter are minimized. Since the zero-order hold circuit is equivalent to a filter with a transfer function of:

$$H(j\omega) = e^{-j\omega T/2M} [2 \sin(\omega T/2M)/\omega]$$

the contribution of the zero-order hold circuit to the modulator spectrum is minimized for small carrier frequencies.

5. Choose the value of J such that the transition bands $$-(J-Q)/T < f < (J-Q)/T$$

and $$-(J+Q)/T < f < (M-J-Q)/T$$

are maximized, where Q is given in condition number 3 above. This choice of J permits the use of the lowest order filters necessary to remove unwanted spectral replicas. Note that consideration of the first transition band becomes important when the digital quadrature modulator output is mixed up in frequency.

Regarding the choice of number of D/A output bits, note that as the number of output bits B is increased, the spectral noise floor decreases. In the preferred embodiments utilizing M = 16, J = 4, L = 8, $B_bT = 0.3$ GMSK modulator, the noise floor decreased from −60 dB to −100 dB when the number of output bits is doubled from 8 to 16.

Once it is realized that the function of the elements of digital modulator 340 can be a function of the bit rate, that the entire modulator can be digitally implemented in a single ROM. Not only does this eliminate the excessive current drain of the discrete digital modulators, digital adder, and separate ROMs, but also the look-up table data for the single ROM can be computed off-line in non-real time. This permits significantly faster operation of the modulator.

The present invention readily permits precise control of the modulation index to be within the $h = 0.05 \pm 0.05$ percent specification. Moreover, accurate amplitude, phase, and carrier suppression is achieved. Greatly improved dynamic range is also possible, since the spectral noise floor is essentially made to be a function of the number of D/A converter output bits. Moreover, the present invention permits such precise control without the use of costly high-tolerance parts.

While only particular embodiments of the present invention have been shown and described herein, it will be obvious that further modifications may be made without departing from the invention in its broader aspects. For example, various other all-digital implementations could be devised utilizing other hardware devices, digital signal processors, or memory configurations. Accordingly, the claims are intended to cover all such changes and alternative constructions that fall within the true scope and spirit of the invention.

What is claimed is:

1. A digital modulator for generating a quadrature modulated signal, said modulator comprising:
   first means for formatting an input data signal into a digital representation of in-phase (I) and quadrature-phase (Q) data signals, including first memory means for storing data and for providing said digital representation of said in-phase (I) and said quadrature-phase (Q) data signals in response to said input data signal;
   means for providing a digital carrier signal representative of an integer multiple of a bit clock signal;
   second means for formatting said digital carrier signal into a digital representation of in-phase (I) and quadrature-phase (Q) carrier signals, including second memory means for storing data and for providing said digital representation of said in-phase (I) and said quadrature-phase (Q) carrier signals in response to said digital carrier signal;
   means, including said second memory means, for storing a digital representation of a quadrature modulated signal, and for providing said digital representation of said quadrature modulated signal in response to said in-phase (I) and quadrature-phase (Q) data signals and said in-phase (I) and quadrature-phase (Q) carrier signals; and means for converting said digital representation of said quadrature modulated signal into an analog output signal having a precise modulation index.

2. The modulator according to claim 1, wherein the functions of said first and second formatting means are performed using entirely digital electronic circuity.

3. The modulator according to claim 1, wherein said first formatting means includes means for translating serial input data into parallel input data.

4. The modulator according to claim 1, wherein said second formatting means includes means for providing a digital carrier signal representative of an integer multiple of said bit clock signal.

5. The modulator according to claim 1, wherein said modulator generates a continuous-phase frequencyshift keyed (CPFSK) signal.

6. The modulator according to claim 5, wherein said modulation index is 0.5±0.05%.

7. The modulator according to claim 1, wherein said modulator generates a Gaussian minimum shift keyed (GMSK) signal.

8. A digital quadrature modulator for generating a continuous-phase frequency-shift keyed (CPFSK) signal, said modulator comprising:

means for translating serial input data having a predetermined bit rate into parallel input data;

means for determining the phase quadrant of said serial input data in response to said bit rate and said parallel input data, thereby providing a phase control signal;

means for interpolating between data bits of said serial input data, thereby providing an interpolation signal; and memory means for providing a digital representation of a CPFSK signal in response to said parallel input data, said phase control signal, and said interpolation signal.

9. The modulator according to claim 8, wherein said translating means includes an L-bit serial-to-parallel shift register into which said serial input data signal is clocked at a bit rate 1/T, thereby generating an L-bit parallel representation of said serial input data signal.

10. The modulator according to claim 9, wherein said phase quadrant determining means includes a 2-bit up/down binary counter, wherein the up/down counter control is determined by the most-significant output bit of said shift register, and wherein said up/down counter is clocked at the bit rate 1/T.

11. The modulator according to claim 8, wherein said interpolating means includes a $\log_2 M$-bit binary counter clocked at M times the bit rate 1/T, thereby providing a parallel data word corresponding to the binary state of said $\log_2 M$-bit counter.

12. The modulator according to claim 8, wherein said memory means is a single read-only memory (ROM) addressed by said parallel input data, said phase control signal, and said interpolation signal.

13. The modulator according to claim 8, wherein said memory means provides a CPFSK signal with a modulation index of 0.5 at a carrier frequency of J/MT, wherein 1/T is the bit rate, wherein J<M/2, and wherein J and M are integers.

14. The modulator according to claim 8, further comprising means for converting said digital representation of said CPFSK signal into an analog CPFSK signal.

15. The modulator according to claim 14, wherein said converting means includes a digital-to-analog converter which provides an analog sampled data signal clocked at M times the bit rate 1/T, wherein M is an integer.

16. The modulator according to claim 14, wherein said converting means includes a filter to select the desired special replica from said analog sampled data signal, thereby providing said analog CPFSK signal.

17. A digital modulator for generating a quadrature modulated signal, said modulator comprising:

first means for transforming a serial data signal into a parallel data signal including first memory means for storage data and providing a digital representation of in-phase (I) and quadrature-phase (Q) data signals in response to said serial data signal;

means for providing a radio frequency (RF) carrier signal representative of an integer multiple of a bit clock signal;

second means for transforming said radio frequency (RF) carrier signal into a digital carrier signal including second memory means for storing data and for providing a digital representation of in-phase (I) and quadrature-phase (Q) carrier signals in response to said digital carrier signal;

means, including said second memory means, for digitally modulating said digital representation of I and Q carrier signals and said digital representation of I and Q data signals, thereby providing a digital representation of a quadrature modulated signal; and means for converting said digital representation of said quadrature modulated signal into an analog output signal having a precise modulation index, whereby digital-to-analog conversion is performed subsequent to quadrature modulation.

18. The modulator according to claim 17, wherein the functions of said modulating means is performed using entirely digital electronic circuitry.

19. The modulator according to claim 17, wherein the functions of said first and second transforming means are performed using entirely digital electronic circuitry.

20. The modulator according to claim 17, wherein said first transforming means includes means for translating serial input data into parallel input data.

21. The modulator according to claim 17, wherein said modulator generates a continuous-phase frequency-shift keyed (CPFSK) signal.

22. The modulator according to claim 21, wherein said modulation index is 0.5±0.05%.

23. A means for generating an analog continuous-phase frequency-shift keyed (CPFSK) signal s(t) by quadrature modulating a radio frequency (RF) carrier $f_c$ with an input signal d(t) utilizing entirely digital circuitry, comprising:

means for providing a data vector d of length L in response to d(t), wherein d has a bit rate 1/T;

means for determining a phase parameter of d(t) in response to d$\wedge$, thereby providing a phase signal $\theta(t, d\wedge)$;

means for providing an interpolation signal having a clock rate M/T;

memory means for providing a digital output signal s(t,dΛ) when addressed with dΛ and said interpolation signal, where $$s(t,d^\Lambda) = A \cos[\omega_c t + \theta(t,d^\Lambda)],$$

and where A = amplitude, and $\omega_c = 2\pi f_c$; and means for converting s(t,dΛ) into s(t).

24. The CPFSK signal generating means according to claim 23, wherein said memory means includes prestored instantaneous values of s(t,dΛ).

25. The CPFSK signal generating means according to claim 23, wherein said phase parameter determining means includes means for determining the phase quadrant of d(t) in response to dΛ, thereby providing phase signal ψ(t,dΛ), wherein said memory means is further addressed with said phase signal ψ(t,dΛ), and wherein $$\theta(t,d^\Lambda) = 2\pi h \sum_{i=n-L+1}^{n} d_i q(t-T) + \psi_n$$

where h is the modulation index, and q(t) is the modulation phase pulse signal.

26. A digital quadrature modulator for generating a continuous-phase frequency-shift keyed (CPFSK) signal having a modulation index of 0.5 comprising:

a formatting circuit comprising:
an L-bit serial-to-parallel shift register into which a serial data signal is clocked at a bit rate 1/T, and which generates an L-bit parallel data signal representative of said serial data signal;
a 2-bit up/down binary counter, clocked at the bit rate 1/T, having its up/down counter control determined by the most significant bit of said parallel data signal, thereby providing a 2-bit phase state signal;
a log₂M-bit counter, clocked at M times the bit rate 1/T, which generates a log₂M-bit data interpolation signal representative of the binary state of said log₂M-bit counter, a memory circuit comprising:
a memory device having $B2^{(L+\log_2 M+2)}$ storage locations, having address lines coupled to said parallel data signal, said phase state signal, and said data interpolation signal, having a B-bit output, and having stored therein representations of CPFSK signal data with a modulation index of 0.5 at a carrier frequency of J/MT where J < M/2, and J and M are integers.

27. The digital quadrature modulator according to claim 26, further comprising a digital-to-analog converter circuit which converts said B-bit CPFSK signal data into analog sampled-data representations of a CPFSK signal clocked at M times the bit rate 1/T.

28. The digital quadrature modulator according to claim 26, further comprising a filter circuit which selects the desired spectral replica of analog signals output from said converter circuit, thereby providing a CPFSK signal having a modulation index of 0.5 having a tolerance within ±0.05%.

29. A method for generating a continuous-phase frequency-shift keyed (CPFSK) signal by quadrature modulating a radio frequency (RF) carrier with a digital input signal utilizing entirely digital techniques, said method comprising the steps of:

translating serial input data having a predetermined bit rate into parallel input data;

determining the phase quadrant of said serial input data in response to said bit rate and said parallel input data, thereby providing a phase control signal;

interpolating between data bits of said serial input data, thereby providing an interpolation signal;

addressing a memory utilizing said parallel input data, said phase control signal, and said interpolation signal;

outputting a digital representation of a CPFSK signal from said memory; and converting said digital representation into an analog CPFSK output signal having a precise modulation index.

30. The method according to claim 29, wherein said translating step includes clocking said serial input data signal into an L-bit serial-to-parallel shift register at a bit rate 1/T, thereby generating an L-bit parallel representation of said serial input data signal.

31. The method according to claim 30, wherein said phase quadrant determining step includes clocking a 2-bit up/down binary counter at the bit rate 1/T, wherein the up/down counter control is determined by the most-significant output bit of said shift register.

32. The method according to claim 29, wherein said interpolating step includes clocking a log₂M-bit binary counter at M times the bit rate 1/T, thereby providing a parallel data word corresponding to the binary state of said log₂M-bit counter.

33. The method according to claim 29, wherein said memory means outputs a CPFSK signal with a modulation index of 0.5 at a carrier frequency of J/MT, wherein 1/T is the bit rate, wherein J < M/2, and wherein J and M are integers.

34. A method for generating a continuous-phase frequency-shift keyed (CPFSK) signal s(t) by quadrature modulating a radio frequency (RF) carrier $f_c$ with a digital input signal d(t) utilizing entirely digital techniques, said method comprising the steps of:

(a) providing a data vector dΛ of length L in response to d(t), wherein d has a bit rate 1/T;
(b) determining a phase parameter of d(t) in response to dΛ, thereby providing a phase signal θ(t,dΛ);
(c) providing an interpolation signal having a clock rate M/T;
(d) addressing a digital memory with dΛ, θ(t,dΛ), and said interpolation signal; and
(e) outputting s(t,dΛ) from said digital memory, wherein $$s(t,d^\Lambda) = A \cos[\omega_c t + \theta(t,d^\Lambda)]$$

and wherein A amplitude and $\omega_c = 2\pi f_c$.

35. The method according to claim 34, further comprising the step of converting the digital signal s(t,dΛ) into an analog signal s(t).

36. The method according to claim 34, wherein said digital memory includes pre-stored instantaneous values of s(t,dΛ).

37. The method according to claim 34, wherein step (b) includes the step of determining the phase quadrant of d(t) in response to dΛ, thereby providing phase signal ψ(t,dΛ).

38. The method according to claim 37, wherein $$\theta(t,d^\Lambda) = 2\pi h \sum_{i=n-L+1}^{n} d_i q(t-T) + \psi_n$$

where h is the modulation index, and q(t) is the modulation phase pulse signal.

39. A method for modulating a radio frequency carrier $f_c$ with a digital input signal d(t), said method comprising the steps of:
- (a) providing a data vector $d\wedge$ of length L in response to d(t), wherein $d\wedge$ has a bit rate 1/T;
- (b) determining the phase quadrant of d(t) in response to $d\wedge$, thereby providing a phase signal $\psi(t,d\wedge)$;
- (c) providing an interpolation signal having a clock rate M/T;
- (d) calculating parameters $s(t,d\wedge)$ of s(t) according to the equation $$s(t,d^\wedge) = A\cos(\omega_c t + \Theta(t,d^\wedge)),$$

where $$\Theta(t,d^\wedge) = 2\pi h \sum_{i=n-L+1}^{n} d_i q(t-T) + \psi_n$$

and where A = amplitude, $\omega_c = 2\pi f_c$, h is the modulation index, and q(t) is the modulation phase pulse signal;
- (e) storing parameters $s(t,d\wedge)$ into a digital memory at address locations determined by $d\wedge$, $\psi(t,d\wedge)$, and said interpolation signal; and
- (f) generating a modulated analog signal responsive to said stored parameters $s(t,d\wedge)$.

40. The method according to claim 39, wherein step (d) further comprises the steps of:
- (1) generating a first quadrature signal I(t) in accordance with the equation $I(t) = \cos[\theta(t,d\wedge)]$;
- (2) generating a second quadrature signal Q(t) in accordance with the equation $Q(t) = \sin[\theta(t,d\wedge)]$;
- (3) generating modulated signal $I_{mod}(t)$ by multiplying T(t) by $\cos[\omega_c(t)]$;
- (4) generating modulated signal $Q_{mod}(t)$ by multiplying Q(t) by $\sin[\omega_c(t)]$; and
- (5) generating $s(t,d\wedge)$ by subtracting $Q_{mod}(t)$ from $I_{mod}(t)$.

41. A method for quadrature modulation of a radio frequency (RF) carrier $f_c$ with an input signal d(t), said method comprising the steps of:
- (a) sampling the input signal d(t) at a sample rate 1/T, thereby creating a sampled data signal d(n) of length L;
- (b) defining parameters of a first signal I(t,d(n)) from said sampled data signal d(n);
- (c) defining parameters of a second signal Q(t,d(n)) from said sampled data signal d(n), wherein Q(t,d(n)) is in phase quadrature with I(t,d(n));
- (d) calculating parameters of modulated signal Imod(t,d(n)) by multiplying I(t,d(n)) by $\cos(\omega_c(t))$, where $\omega_c = 2\pi f_c$;
- (e) calculating parameters of modulated signal $Q_{mod}^{(t,d(n))}$ by multiplying Q(t,d(n)) by $\sin(\omega_c(t))$;
- (f) calculating parameters of a continuous-phase frequency shift keyed (CPFSK) signal s(t,d(n)) by subtracting $Q_{mod}^{(t,d(n))}$ from $I_{mod}^{(t,d(n))}$;
- (g) storing parameters of said CPFSK signal s(t,d(n)) into a digital memory; and
- (h) generating an analog signal responsive to said stored parameters of said CPFSK signal s(t,d(n)).

42. A radio transmitter comprising:
- means for providing a bit clock signal having a predetermined bit rate;
- means for providing serial input data having said bit rate;
- means for translating said serial input data into parallel input data;
- first memory means for storing data and for providing a digital representation of in-phase (I) and quadrature-phase (Q) component data signals in response to said parallel input data;
- means for providing a digital carrier signal representative of an integer multiple of said bit clock signal;
- second memory means for storing data and for providing a digital representation of in-phase (I) and quadrature-phase (Q) component carrier signals in response to said digital carrier signal;
- means, including said second memory means, for digitally modulating said I and Q carrier signals by said I and Q data signals, said second memory means further comprising means for storing data and for providing said digital quadrature modulating signal in response to said I and Q carrier signals and said I and Q data signals, thereby providing I and Q digital component signals;
- means, including said second memory means, for combining said I and Q digital component signals, thereby providing a digital quadrature modulated signal;
- means for converting said digital quadrature modulated signal into an analog output signal; and
- means for transmitting said analog output signal.

43. The transmitter according to claim 42, further comprising:
- means for determining the phase quadrant of said serial input data in response to said bit rate and said parallel input data, thereby providing a phase control signal; and
- means for interpolating between data bits of said serial input data in response to said bit rate, thereby providing an interpolation signal.

44. The transmitter according to claim 43, wherein said second memory is addressed by said interpolation signal.

45. The transmitter according to claim 43, wherein said first and second memories are addressed by said parallel input data, said phase control signal, and said interpolation signal.

46. The transmitter according to claim 42, wherein said quadrature modulated signal is a continuous-phase frequency-shift keyed (CPFSK) signal.

47. The transmitter according to claim 46, wherein said analog output signal has a modulation index equal to 0.5±0.05%.

48. The transmitter according to claim 42, wherein said quadrature modulated signal is a Gaussian minimum shift keyed (GMSK) signal.

* * * * *